Patented Sept. 30, 1941

2,257,717

UNITED STATES PATENT OFFICE 2,257,717

MANUFACTURE AND PURIFICATION OF UREA DERIVATIVES

John F. Olin, Grosse Ile, Mich., assignor to Sharples Chemicals Inc., a corporation of Delaware No Drawing. Application March 24, 1941, Serial No. 384,951

6 Claims. (Cl. 260—553)

The present invention pertains to the preparation and purification of alkyl derivatives of urea. In my co-pending application No. 278,175, for Manufacture of derivatives of urea, I have described an economical process of producing alkyl derivatives of urea, including monoalkyl and alkylol ureas, symmetrical dialkyl and -alkylol ureas, unsymmetrical dialkyl and -alkylol ureas, and trialkyl and -alkylol ureas. The process of that application is also applicable to the manufacture of various mixtures of any or all of the above derivatives.

In the preparation of monobutyl urea, for example, in accordance with the process of that application, butylamine is mixed with at least a slight molecular excess of urea, and the ensuing alkylation is preferably accomplished in an autoclave equipped with an efficient pressure column. The column is connected to a dephlegmating condenser provided with a water-cooled jacket. This column is preferably packed with glass Raschig rings or equivalent packing. The top of the dephlegmating condenser is connected to an outlet conduit provided with a suitable valve for preventing escape of ammonia until the autogenous pressure in the autoclave reaches a predetermined point, and for permitting escape of ammonia after the pressure reaches the desired point, while maintaining that pressure in the autoclave.

The contents of the reactor are next heated to a temperature above 100° C., and preferably somewhat above 115° C., until a pressure in excess of 125-175 pounds per square inch is developed in the autoclave. When this temperature and pressure are attained ammonia is allowed to escape through the valve in the conduit connected to the top of the dephlegmating column. If desired, the valve may be a pressure release valve designed to permit the escape of ammonia automatically upon the attainment of the desired pressure.

Ammonia is continuously refluxed to the column during the course of the reaction, thereby preventing the escape of the alkyl amine from the autoclave.

By conducting the reaction as described above, an excellent yield of the desired butyl urea is obtained, since the refluxing of ammonia keeps all of the butylamine in the reactor until the reaction is completed, and the continuous removal of ammonia from the system avoids the presence of a large quantity of ammonia in the reactor during the course of the reaction, and thus permits the reaction to proceed to the right in accordance with the following equation:

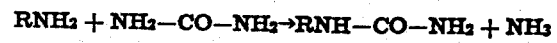

If dibutyl urea is desired as the principal product, the initial reaction mixture should contain approximately two molecular proportions of butyl amine for each such proportion of urea. By varying the relative proportions of butyl amine and urea a mixture containing practically any desired ratio of butyl urea to dibutyl urea may be obtained. In any case, the reaction technique will be substantially the same as that described above with respect to preparation of monobutyl urea, except that the reaction mass should be heated to a somewhat higher temperature (e. g., 150-170° C.), in the production of dibutyl urea.

The process of the invention may be employed in producing various alkyl derivatives of urea containing from 1 to 20 carbon atoms in the alkyl radical, including the cyclo-alkyl ureas, such as cyclohexyl ureas. Thus, it may be employed in the manufacture of octyl urea, dodecyl urea, cetyl urea or various other alkyl derivatives of urea or mixtures thereof. It may also be employed in the manufacture of the corresponding alkylol derivatives. Thus, ethanol urea may be produced by reaction of ethanol amine with urea under the same conditions described above for reaction of butyl amine with urea, and symmetrical diethanol urea may be produced similarly to the production of dibutyl urea as described above.

Unsymmetrical dialkylureas may be similarly produced by reaction of dialkyl amines with urea, trialkyl ureas may be produced by reaction of mixtures of monoalkyl amines and dialkyl amines with urea, or of dialkyl amines upon monoalkyl ureas.

As pointed out above, it is desirable that the reaction be conducted under pressure, and an ammonia reflux maintained, in condensation of the lower alkyl amines with urea, but this feature is not so important in alkylation with the non-volatile amines, and may be omitted in making the higher alkyl ureas, such as the butyl and higher derivatives.

As indicated above, the nature of the principal alkyl derivative of urea resulting from the reaction may be controlled, to a large extent at least, by judicious choice of the ratio of urea to amine in the reaction mixture. Regardless of such control, however, mixtures of urea derivatives of higher degree of alkylation with those of lower degree of alkylation or with unsubstituted urea will be obtained, and the principal feature of the present invention involves provision of a satisfactory method of separating these constituents of the reaction mixture from each other.

The alkyl derivatives of urea are solid crystalline substances which are unstable at higher temperatures and cannot, in most cases, be satisfactorily purified by fractional distillation. Attempts to effect the desired separation by extraction with alcohols also leave much to be desired, since the lower alcohols do not have the desired delicate selectivity of solvent action, and the higher alcohols are difficult to remove from the purified alkyl ureas. In accordance with the process of my prior application, Serial No. 278,175, referred to above, the desired separation is attained by the selective solvent effect of water and/or hydrocarbon solvents at carefully controlled temperatures, but even this method of separation is not entirely satisfactory.

As the result of a large number of experiments, I have determined that remarkably efficient separation of the various alkyl derivatives of urea from each other and from simple urea may be attained by selective extraction of these reaction mixtures with aliphatic ketones containing between 3 and 9 carbon atoms, the range between 3 and 6 carbon atoms being preferred. Simple urea is almost completely insoluble in these ketones, except at very high temperatures. The monoalkyl ureas are soluble in the hot ketones, but they are precipitated upon cooling of the ketones, so that good separation of these monoalkyl derivatives of urea from derivatives of higher degree of alkylation may be attained by selective crystallization from ketone solutions. Symmetrical dialkyl ureas, which usually accompany the monoalkyl ureas in the practice of the alkylation process as discussed above, are soluble in the ketones, at both high and low temperatures. These marked differences in solubility make it possible to dissolve the crude reaction product containing derivatives of varying degrees of alkylation by heating the crude reaction product (preferably to boiling) with an aliphatic ketone in proper proportion, cooling the resulting solution to precipitate urea and/or lower alkyl derivatives of urea, and separating the precipitated derivatives by appropriate mechanical means such as filtration or centrifugation, or by simple gravity settling, leaving ureas of higher degree of alkylation dissolved in the ketone. This process of selective crystallization and separation of precipitated crystals may be repeated at successively lower temperatures to separate, in a first operation, simple urea, in a second operation, monoalkyl urea, etc., leaving the derivative of the highest degree of alkylation dissolved in the ketone. The derivative of the highest degree of alkylation may thereafter be removed from the ketone by evaporation of the ketone and washing of the urea derivative with hot water to remove urea derivatives of lower degree of alkylation with which it may still be contaminated.

The various aliphatic ketones containing between 3 and 6 carbon atoms, such as acetone, methyl ethyl ketone, diethyl ketone, methyl propyl ketone, ethyl propyl ketone, methyl isobutyl ketone, etc., may be used as the selective solvent in the practice of the invention. As a general proposition, ketones of higher carbon content have a stronger solvent action on the urea derivatives of higher degree of alkylation, or of higher carbon content in the individual alkyl radicals. No general rule can be laid down as to exact temperatures, for the temperatures at which the successive operations of solution of the reaction mixture in the ketone and precipitation of constituents selectively from the ketone can be best accomplished will depend upon the particular mixture of alkyl derivatives of urea to be subjected to the separating operation and the particular ketone to be used in the extraction. In any case, these factors can be very easily determined experimentally in connection with the particular reaction mixture to be treated and the particular ketone to be used. Instead of dissolving the crude urea reaction mixture in the ketone, and thereafter precipitating constituents successively from the ketone, the extraction operation may be accomplished by selectively dissolving the urea derivatives of higher degree of alkylation in the ketone at temperatures adapted to dissolve these higher derivatives selectively and thus separate them from simple urea or lower derivatives.

The following examples illustrate the practice of the invention in manufacture and separation of urea derivatives of varying carbon content and degrees of alkylation, with various ketones.

*Example I*

A mixture of 100 grams butyl urea and urea, obtained by alkylation of one mol urea by ½ mol butyl amine, was pulverized and mixed with 300 cc. of anhydrous acetone, which was then boiled for two minutes. The resulting product was then cooled to 30° C. and filtered at that temperature. The filtrate was washed with 100 cc. of cold acetone and partially dried by suction on a Büchner funnel for five minutes. 33 grams of urea were thus obtained. The filtrate was placed in a beaker and the acetone evaporated on a steam bath. The residue was then dried by passing a current of air through it at 125° C. for ten minutes. In this manner 65 grams of butyl urea softening at approximately 80° C. were obtained.

*Example II*

A mixture containing 17 grams of urea, 30 grams of monobutyl urea, and 3 grams of symmetrical dibutyl urea, resulting from alkylation of urea with butyl amine, was pulverized and added to 200 cc. of methyl ethyl ketone. The resulting mixture was stirred at a temperature of 50° C. for one hour and then cooled to 20° C. and filtered on a suction filter. A solid product was obtained on the filter which was found to weigh 17.5 grams after drying at 80° C., and had a melting point of 128° C. This product was urea. The filtrate, upon cooling to −20° C. gave a heavy crop of crystals. The resulting mixture was then filtered, and the filtered crystals were dried and found to have a melting point of 85° C. and to weigh 27 grams. They consisted principally of monobutyl urea. Most of the dibutyl urea could have been recovered by evaporation of the mother liquor from the filtration operation.

*Example III*

50 grams of the same crude butyl urea reaction mixture referred to in Example II were refluxed for a few minutes in 200 cc. of methyl propyl ketone. Upon cooling the resulting solution to 25° C., a clean precipitation of urea crystals was observed. These crystals were filtered from the remaining solution, and the filtrate was thereafter chilled to 0° C. Crystals precipitated at this latter temperature were removed in the second filtering step and washed with a small quantity of cold methyl propyl ketone. The washed crystals consisted principally of butyl urea and melted at 88° C.

Example IV 50 grams of the crude butyl urea reaction mixture referred to in Examples II and III were mixed with 200 grams of methyl isobutyl ketone and the ketone was boiled for several minutes under reflux to dissolve the urea constituents. The resulting solution was then cooled to a temperature of 35° C. to precipitate simple urea, and the precipitated urea was removed by filtration. Upon cooling the resulting filtrate to 0° C. the butyl urea crystallized from solution and was separated by a second filtration step. The dibutyl urea remained in solution in the ketone.

Example V 1740 parts of 2-amino pentane and 2400 parts of urea are placed in a stainless steel autoclave to which is attached a fractionating column provided with a dephlegmator and a take-off for ammonia vapors. The autoclave is sealed, and the contents heated with stirring to a temperature of 145° C., ammonia being vented through the column at a pressure of 180 to 200 lbs. per square inch. After approximately one hour, the reaction is complete, as evidenced by the drop of pressure to 100 lbs. per square inch. The product in the autoclave is allowed to cool to 100° C. and the remainder of the ammonia is vented to the atmosphere. After cooling to room temperature, the product is removed from the autoclave and refluxed with 10,000 parts of methyl isobutyl ketone. This operation is continued for about ½ hour and the mass is filtered through a suction funnel while still hot. After washing with a small further quantity of hot methyl isobutyl ketone, the precipitate is dried and will be found to consist of urea with a melting point of about 127 to 131° C., and to correspond by weight to approximately 30% of the original charge. Upon cooling the filtrate to 10° C., a large amount of 2-ureido pentane (secondary-monoamyl urea) is precipitated. This precipitate is filtered from the mother liquor, washed with a small quantity of cold methyl isobutyl ketone, and dried. A nearly pure product melting between 138 and 140° C. is obtained. After evaporating the final mother liquor to dryness a small quantity of symmetrical di-secondary-amyl urea, contaminated with some mono-secondary-amyl urea, is obtained.

As an alternative to the above procedure, the crude mixture of urea and secondary amyl urea may be continuously extracted by means of a reflux apparatus, such as a Soxlett extraction apparatus.

Example VI 200 grams of a mixture of mono-methyl urea and urea obtained by the action of one mol mono-methyl amine upon two mols of urea, in a manner similar to that employed in Example V, are refluxed for a short time with 500 grams of methyl ethyl ketone. The resulting mixture is filtered while still hot, in order to separate undissolved urea. The filtrate is then cooled to 0° C., and a large amount of crude methyl urea crystallizes out. This is removed by suction filtration and dried. It will be found to melt between 90 and 94° C. Two further crystallizations from 400 grams of methyl ethyl ketone will yield a pure white methyl urea product melting between 100 and 102° C. The yield of purified product is about 75% of that theoretically possible.

Example VII 185 grams of technical normal-dodecyl amine is heated with 120 grams of urea at atmospheric pressure and a temperature of 130 to 150° C. with violent agitation for two hours. During this time, approximately 17 grams of ammonia is liberated. The resulting crude mixture, consisting of approximately equimolecular quantities of mono-dodecyl urea and urea, together with traces of di-dodecyl urea, is boiled for several minutes with 500 grams of methyl isobutyl ketone. The resulting mixture is filtered while still hot, with the result that a substantial separation of urea from the mixture is attained. As soon as the filtrate has cooled to about 70° C. crystallization begins to occur so that a heavy precipitate of feathery crystals is obtained by the time the temperature drops to about 20° C. The product is now filtered by means of a suction filter, washed with two 150 cc. portions of methyl-isobutyl ketone and dried. It will be found to have a melting point of about 91 to 94° C.

Various modifications will be obvious to those skilled in the art, and I do not therefore wish to be limited except by the scope of the following claims.

I claim:

1. A process of producing alkyl derivatives of urea which comprises reacting an alkyl amine with urea by heating a mixture of said alkyl amine and urea to a temperature between 100° C. and the decomposition temperature of the desired alkyl urea and thereby producing a reaction mixture containing an alkyl urea reaction product and unchanged urea, and thereafter separating the alkyl urea reaction product from the unchanged urea by extracting the alkyl urea reaction product from said unchanged urea with an aliphatic ketone containing between 3 and 9 carbon atoms at a temperature at which said alkyl urea is soluble in said ketone but at which the unchanged urea is insoluble in said ketone.

2. A process of producing alkyl derivatives of urea which comprises reacting an alkyl amine with urea by heating a mixture of said alkyl amine and urea to a temperature between 100° C. and the decomposition temperature of the desired alkyl urea and thereby producing a reaction mixture containing a first urea constituent chosen from the class consisting of unchanged urea, an alkyl urea, and a mixture of unchanged urea and alkyl urea, and a second urea constituent consisting of an alkyl urea of a higher degree of alkylation than said first urea constituent, and thereafter separating said second urea constituent from said first urea constituent by extracting the mixture of said first and second constituents with an aliphatic ketone containing between 3 and 9 carbon atoms at a temperature at which the second urea constituent is soluble in said ketone but at which the first urea constituent is insoluble in said ketone.

3. A process as defined in claim 1, in which the ketone used in the extracting operation has between 3 and 6 carbon atoms.

4. A process as defined in claim 2, in which the ketone used in the extracting operation has between 3 and 6 carbon atoms.

5. In the manufacture of alkyl derivatives of urea, the step of purifying a reaction mixture containing a first reaction constituent chosen from the class consisting of urea, alkyl derivatives of urea, and mixtures of urea and alkyl derivatives of urea, and a second reaction constituent consisting of an alkyl derivative of urea of a higher degree of alkylation than said first reaction constituent, said step being accomplished by separating said first reaction constituent from said second constituent by extracting the mixture of said first reaction constituent and said second reaction constituent with an aliphatic ketone containing between 3 and 9 carbon atoms at a temperature at which said first reaction constituent is insoluble in said ketone but at which said second reaction constituent is soluble in said ketone.

6. A process as defined in claim 5, in which the ketone used in the extracting operation has between 3 and 6 carbon atoms.

JOHN F. OLIN.